(12) United States Patent
Custers et al.

(10) Patent No.: US 9,873,079 B2
(45) Date of Patent: Jan. 23, 2018

(54) PROCESS FOR CAPTURING CO2 FROM A CO2-CONTAINING GAS STREAM USING A THERMORESPONSIVE COPOLYMER

(71) Applicant: CarbonOrO B.V., Nijmegen (NL)

(72) Inventors: Johannes Petrus Aldegonda Custers, Baexem (NL); Matheus Theodorus De Groot, Utrecht (NL); Antoon Jacob Berend Ten Kate, Arnhem (NL); Dirk Theodorus Andreas Van Asseldonk, Veghel (NL); Johannes Theodorus Faustinus Keurentjes, Helmond (NL)

(73) Assignee: CarbonOrO B.V., Nijmegen (NL)

( * ) Notice: Subject to any disclaimer, the term of this patent is extended or adjusted under 35 U.S.C. 154(b) by 308 days.

(21) Appl. No.: 14/777,269

(22) PCT Filed: Mar. 12, 2014

(86) PCT No.: PCT/EP2014/054854
§ 371 (c)(1),
(2) Date: Sep. 15, 2015

(87) PCT Pub. No.: WO2014/140108
PCT Pub. Date: Sep. 18, 2014

(65) Prior Publication Data
US 2016/0030881 A1    Feb. 4, 2016

Related U.S. Application Data

(60) Provisional application No. 61/806,089, filed on Mar. 28, 2013.

(30) Foreign Application Priority Data

Mar. 15, 2013  (EP) ................................. 13159547

(51) Int. Cl.
*B01D 53/14*  (2006.01)
*B01D 53/62*  (2006.01)

(52) U.S. Cl.
CPC ..... *B01D 53/1475* (2013.01); *B01D 53/1493* (2013.01); *B01D 53/62* (2013.01);
(Continued)

(58) Field of Classification Search
None
See application file for complete search history.

(56) References Cited

U.S. PATENT DOCUMENTS

2010/0104490 A1    4/2010  Bouillion et al.
2010/0288126 A1   11/2010  Agar et al.

FOREIGN PATENT DOCUMENTS

DE    10 2004 053167 A1    5/2006
EP          0 534 774 A1    3/1993
(Continued)

OTHER PUBLICATIONS

Hoshino et al. "Reversible absorption of CO2 triggered by phase transition of amine-containing micro- and nanogel particles" Journal of the American Chemical Society, Nov. 7, 2012, vol. 134, No. 44, pp. 18177-18180.

(Continued)

*Primary Examiner* — Anita Nassiri Motlagh
(74) *Attorney, Agent, or Firm* — Gilberto M. Villacorta; Sunit Talapatra; Foley & Lardner LLP (57) ABSTRACT

A process capturing $CO_2$ from a $CO_2$-containing gas stream, contacting a $CO_2$-containing gas stream with a $CO_2$-absorbing agent in an absorption step in a vessel with maximum temperature T1 resulting in absorption of $CO_2$. The $CO_2$ absorbing agent comprising a polymer dissolved in an aqueous medium, the polymer, a thermoresponsive copolymer, comprising amine monomer distributed through the copolymer, subjecting the $CO_2$-containing absorbing agent to a desorption step in a vessel with maximum temperature T2, releasing $CO_2$, wherein T1 is below LCST of the (Continued)

thermoresponsive polymer at maximum $CO_2$ loading, and T2 is above LCST of the thermoresponsive polymer at minimum $CO_2$ loading. $CO_2$ absorbing agent comprises amine component dissolved in the aqueous medium. Use of the specific polymer dissolved in an aqueous medium at T1, wherein amine monomer, distributed through the copolymer with an amine component, improves net $CO_2$ sorption and high absorption speed, allowing a relatively small absorption reactor.

28 Claims, 3 Drawing Sheets

(52) U.S. Cl.
CPC .. *B01D 53/1425* (2013.01); *B01D 2252/2053* (2013.01); *B01D 2252/504* (2013.01); *B01D 2257/504* (2013.01); *Y02C 10/04* (2013.01); *Y02C 10/06* (2013.01)

(56) References Cited

FOREIGN PATENT DOCUMENTS

| | | |
|---|---|---|
| EP | 2 412 425 A1 | 2/2012 |
| EP | 2 745 930 A1 | 6/2014 |
| JP | 2010-155753 | 7/2010 |
| WO | WO 2013/027668 A1 | 2/2013 |

OTHER PUBLICATIONS

International Search Report issued in International Patent Application No. PCT/EP2014/054854 dated May 27, 2014.

PROCESS FOR CAPTURING CO2 FROM A CO2-CONTAINING GAS STREAM USING A THERMORESPONSIVE COPOLYMER

CROSS-REFERENCE TO RELATED APPLICATIONS

This application is the National Phase of International Patent Application No. PCT/EP2014/054854, filed Mar. 12, 2014, published on Sep. 18, 2014 as WO 2014/140108 A1, which claims priority to European Application No. 13159547.2, filed Mar. 15, 2013, and U.S. Provisional Application No. 61/806,089, filed Mar. 28, 2013. The contents of which are herein incorporated by reference in its entirety.

FIELD OF THE INVENTION

The present invention pertains to a process for capturing $CO_2$ from a $CO_2$ containing gas stream. $CO_2$ is produced as side product in many chemical processes, e.g. from combustion of organic materials in power plants. Release of $CO_2$ into the atmosphere is undesirable in view of its contribution to the greenhouse effect. Further, $CO_2$ itself can be used as starting material for chemical reactions. There is therefore need for a method for capturing $CO_2$ from a $CO_2$ containing gas stream, which is not only effective in capturing $CO_2$, but which also allows release of the $CO_2$ to allow it to be processed further.

BACKGROUND OF THE INVENTION

Methods for capturing $CO_2$ from a $CO_2$-containing gas stream are known in the art. The most commonly applied method is post combustion $CO_2$ capture, which is generally carried out in the following way: a $CO_2$ containing gas stream coming from, e.g., a coal fired power plant is contacted in an absorption column with an amine-containing aqueous liquid at a temperature of about 40° C., which results in absorption of the $CO_2$. A commonly used amine is monoethanolamine (MEA). The $CO_2$-containing liquid stream is subsequently brought to a desorption column, which is operated at elevated temperature (>100° C.). In this column the $CO_2$ is desorbed, after which it is compressed and ready for further use. The depleted liquid is returned to the absorption column. A weakness of this process is the relatively high energy consumption of the process. This high energy consumption is a result of the relatively high temperature needed in the desorption column to obtain sufficient $CO_2$ desorption.

There have been many investigations into $CO_2$ capture processes with lower energy consumption. One particularly interesting idea concerns the use of a phase separation to enhance the desorption of $CO_2$ in such a way that it occurs at lower temperatures. For example, US2010/0288126 describes a process wherein a $CO_2$-containing gas stream is contacted with a $CO_2$-absorbing agent, followed by at least partial removal of the $CO_2$ absorbing agent and inducing a phase separation accompanied by the release of $CO_2$. US2010/0104490 describes an integrated process using such phase separation steps.

JP2010-155753 describes a process for capturing $CO_2$ wherein $CO_2$ is absorbed using an aqueous solution comprising a nitrogen-containing compound and a high molecular weight temperature-sensitive compound. The nitrogen-containing compound and the high molecular weight temperature-sensitive compound are either in separate molecules, or in the form of a block-copolymer.

Hoshino et al. (Y. Hoshino, Reversible Absorption of $CO_2$ triggered by Phase Transition of Amine-containing Micro- and Nano-gel Particles, Journal of the American Chemical Society 2012, 134, 18177-18180) describes a $CO_2$-catching polymer which comprises an amine-containing monomer built into a non-$CO_2$ responsive thermosensitive polymer. The polymer also contains crosslinker, and is a hydrogel. At low temperatures the hydrogel is hydrophilic in nature but cannot dissolve because of the crosslinker; it acts like a gel-like material. At high temperatures the hydrogel is hydrophobic in nature and is insoluble; it acts like a solid phase.

WO2013/27668 describes the use of a polymer comprising an amine-containing monomer built into a non-$CO_2$ responsive thermosensitive polymer in a system to generate an ion concentration, or to adsorb $CO_2$.

While the systems described in these references are attractive in principle since they enable $CO_2$ desorption at a lower temperature than the MEA system, they suffer from various disadvantages. In particular, it has been found that the net $CO_2$ sorption of the process may be improved.

The quantity of $CO_2$ absorbed can be expressed in the loading $\alpha$, which is defined as follows:

$$\alpha = \frac{\text{moles } CO_2 \text{ absorbed}}{\text{moles amines present}}$$

The net $CO_2$ sorption, $\alpha_{net}$, in the process can be defined as the difference in $\alpha$ at the end of the adsorption step ($\alpha_{T1}$) and at the end of the desorption step ($\alpha_{T2}$):

$$\alpha_{net} = \alpha_{T1} - \alpha_{T2}$$

Further problems that may be recognized in the processes of the prior art are the following. The amine compounds used in US2010/0288126, and to a lesser degree those of JP2010-155753 are relatively volatile and susceptible to thermal degradation. Due to the temperature swing applied, this is a major issue in the commercial operation of the processes described therein. The system of Hoshino et al. suffers from slow absorption kinetics due to the use of a hydrogel.

The present invention provides a solution for these problems.

SUMMARY OF THE INVENTION

The present invention pertains to a process for capturing $CO_2$ from a $CO_2$-containing gas stream, comprising the steps of contacting a $CO_2$-containing gas stream with a $CO_2$-absorbing agent in an absorption step in a vessel with a maximum temperature T1 resulting in absorption of $CO_2$, the $CO_2$ absorbing agent comprising a polymer dissolved in an aqueous medium, the polymer being a thermoresponsive copolymer comprising amine monomer distributed through the copolymer, and subjecting the $CO_2$-containing absorbing agent to a desorption step in a vessel with a maximum temperature T2, resulting in the release of $CO_2$, wherein T1 is below the LCST of the thermoresponsive polymer at maximum $CO_2$ loading, and T2 is above the LCST of the thermoresponsive polymer at minimum $CO_2$ loading, wherein the $CO_2$ absorbing agent additionally comprises amine component dissolved in the aqueous medium.

T1 and T2 are maximum temperatures in the vessel. Lower temperatures may be present in the vessel. For example, if the reaction is carried out in a columnar reactor with the $CO_2$-absorbing agent being withdrawn from the bottom of the reactor, the bottom temperature will be the highest temperature T1. The temperature at the entrance of the reactor will be lower.

As will be evident to the person skilled in the art, the LCST of the polymer is dependent on the amount of $CO_2$ absorbed onto the polymer. T1 should be below the LCST of the thermoresponsive polymer at maximum $CO_2$ loading. This is to ensure that the absorption of (a substantial part, e.g., at least 50%, preferably at least 70%, in particular at least 80%, more in particular at least 90%, of) the $CO_2$ takes place when the polymer is dissolved. The maximum $CO_2$ loading is the maximum amount of $CO_2$ that can be absorbed by the polymer under the conditions prevailing during the absorption step. This value can be determined by simple absorption experiments. T2 should be above the LCST of the thermoresponsive polymer at minimum $CO_2$ loading. This is to ensure that the desorption of (a substantial part, e.g., at least 50%, preferably at least 70%, in particular at least 80%, more in particular at least 90%, of) the $CO_2$ takes place when the polymer has gone through its LCST point. The minimum $CO_2$ loading is the minimum amount of $CO_2$ that will remain on the polymer under the conditions prevailing during the desorption step. This value can be determined by simple absorption/desorption experiments.

It has been found that due to the selection of a specific polymer, namely a polymer which is dissolved in an aqueous medium at T1, and wherein amine monomer is distributed through the copolymer, and by the presence of additional amine component, an improved net $CO_2$ sorption, $\alpha_{net}$, can be obtained as compared to the systems of JP2010-155753 and US2010/0288126 for similar values for T1 and T2 and amine concentrations. Further, the polymer used in the present invention, which is dissolved in the aqueous medium at T1, has a high absorption speed, which allows the use of a relatively small absorption reactor. Further, as compared to the amine-containing system of US2010/0288126, and to a lesser degree JP2010-155753, the polymer used in the process according to the invention has a low volatility and a high thermal stability, making for a long term stable process. Further, because the polymer is less corrosive as compared to the amine-containing system of US2010/0288126, less expensive vessel materials can be used. Further advantages of the present invention and specific embodiments thereof will become clear from the further specification.

DETAILED DESCRIPTION OF THE INVENTION

The polymer used in the process according to the invention is a thermoresponsive polymer. A thermoresponsive polymer system within the meaning of the present specification is a polymer which in an aqueous medium is capable of undergoing significant changes in hydration in response to a change in temperature of the aqueous medium. More specifically, at a temperature below its lower critical solution temperature (LCST), the polymer is dissolved in the aqueous medium. At a temperature above the LCST, phase separation occurs in that the polymer precipitates from the aqueous medium. Within the context of the present specification the LCST is defined as the temperature where the aqueous medium containing the polymer changes from a homogeneous solution to a heterogeneous solution.

The thermoresponsive polymer used in the process according to the invention has an LCST in the range of 1-99° C., more preferably in the range of 10-80° C., still more preferably in the range of 20-70° C.

The LCST of a polymer depends on a number of factors, including the composition of the polymer, as will be discussed in more detail below, the pH of the aqueous medium, the concentration of the polymer in the aqueous medium, the composition of the aqueous medium, and the amount of $CO_2$ absorped.

The LCST of the polymer mentioned above is the LCST of the polymer as it is in the $CO_2$ absorption agent, determined as follows:

The LCST of the $CO_2$ absorbing agent can be determined by means of DSC (differential scanning calorimetry), wherein, upon heating the $CO_2$ absorbing agent from T1 to T2, the LCST is the abscissa temperature at the maximum of the endothermic peak.

The polymer used in the process according to the invention is a copolymer comprising amine monomers and LCST monomers. The amine monomers are primarily responsible for $CO_2$ absorption in the final polymer; the LCST monomers are primarily responsible for the LCST effect in the final polymer. For the avoidance of doubt, the LCST monomers, also indicated as thermoresponsive monomers, will not show thermoresponsive behaviour in the monomer form. Neither do homopolymers of these monomers necessarily show thermoresponsive behaviour. With the context of the present specification the term thermoresponsive monomer or LCST monomer intends to refer to the monomer primarily responsible for the thermoresponsive behaviour, in contrast with the amine monomer, which is primarily responsible for the $CO_2$ absorption behaviour.

In general the LCST monomer has a higher hydrophobicity than the amine monomer. In general the LCST monomer has a lower solubility than the amine monomer.

It is noted that, as is evident to the skilled person, the polymer strictly speaking does not contain monomer molecules, but contains monomeric units derived from monomer molecules. For ease of reference both are indicated as monomers in the present specification.

The polymer used in the process according to the invention is a copolymer comprising amine monomer distributed through the copolymer. Within the context of the present specification this means that the amine monomers are distributed in such a fashion that at least 80% of the amine monomers in the polymer are present in arrays of maximum 10 amine monomers, which are combined with arrays of thermoresponsive monomers, with each polymer molecule comprising at least 2 areas of both monomer types. This is in contrast with block copolymers, wherein a block of a first type of monomer is connected to a block of a second type of monomer, resulting in a polymer of the formula AAA( . . . ) AAA-BBB( . . . )BBB. It has been found that, as compared to the use of a block copolymer, a copolymer of the same monomers wherein the amine monomers are distributed through the polymer results in a higher $\alpha_{net}$. Not wishing to be bound by theory, it is believed that this is caused by the fact that in random copolymers the influence of the thermosensitive part of the polymer on the $CO_2$ absorption properties is increased.

As indicated above, in the polymers used in the present invention the amine monomers are distributed in such a fashion that at least 80% of the amine monomers in the polymer are present in arrays of maximum 10 amine monomers, which are combined with arrays of thermoresponsive monomers, with each polymer molecule comprising at least 2 areas of both monomer types. The size of the arrays of thermoresponsive monomers may vary, depending, int. al., on the amount of the respective monomer in the polymer. Where the amount of amine polymer is relatively low, the arrays of thermoresponsive monomer may be relatively large.

In one embodiment, the amine monomers are distributed randomly through the copolymer. The wording "randomly distributed" is well known in the art of polymer technology. It refers to polymers wherein the monomeric units are distributed randomly, and sometimes unevenly, in the polymer chain, e.g., as ~ABBAAABAABBBABAABA~. These types of polymers are also indicated as statistical copolymers.

In one embodiment of the present invention, at least 50% of the amine monomers is present in the copolymer in arrays with a size of 1-8 monomers, in particular 1-4 monomers, more in particular 1-2 monomers. Preferably, at least 70% of the amine monomers is present in such arrays, more preferably at least 80%. It is believed that the presence of a substantial part of the amine monomers in arrays of this type results in improved absorption/desorption characteristics of the polymer.

It may be preferred within the embodiments discussed above for the arrays of thermoresponsive monomers which intersperse the arrays of amine monomers to have a size which is just sufficient to ensure LCST-behaviour of the polymer. Depending on the type of monomer, it may be preferred for the thermoresponsive monomer to be distributed in such a fashion that at least 50% of the thermoresponsive monomers in the polymer are present in arrays of 3-30 monomers. Preferably, at least 70% of the thermoresponsive monomers is present in such arrays, more preferably at least 80%. More preferably, the arrays have a size of 3-20 monomers, more preferably 3-10 monomers.

The amine monomer content in the thermoresponsive copolymer generally is in the range of 0.1-99 mol %, preferably in the range of 1-70 mol %, more preferably in the range of 10-50 mol %.

The amine monomer may be any polymerizable monomer containing at least one primary, secondary or tertiary amine functional group. Tertiary amines are most preferred, with secondary amines being less preferred, and primary amines being still less preferred.

The amine preferably has in the range of 2 to 20 carbon atoms, more preferably in the range of 5 to 12 carbon atoms.

Preferably, the amine monomer is selected from the group of amine functionalized acrylamides, amine functionalized methacrylamides, amine functionalized acrylates, amine functionalized methacrylates, and cyclic amine monomers. More preferably, the amine monomer is selected from the group of dimethylaminopropyl acrylamide (DMAPAM), dimethylaminoethyl methacrylate, diethylallyl amine, dimethylaminopropyl methacrylate, dimethylamino propyl methacrylamide, diethylaminoethyl methacrylate, diethylamino ethyl acrylamide, diethylamino propyl acrylamide, diethylamino ethyl methacrylamide, diethylamino propyl acrylamide, dimethylamino ethyl acrylamide, dimethylaminopropyl acrylate, diethylaminopropyl methacrylate, diethylaminopropyl acrylate, diethylaminoethyl acrylate, 2-(Diethylamino)ethylstyrene, 2-(N,N-Dimethylamino)ethyl acrylate, 2-(tert-Butylamino)ethyl methacrylate, 2-Diisopropylaminoethyl methacrylate, 2-N-Morpholinoethyl acrylate, 2-N-Morpholinoethyl methacrylate, 3-Dimethylaminoneopentyl acrylate, N-(t-BOC-aminopropyl)methacrylamide, N-[2-(N,N-Dimethylamino)ethyl]methacrylamide. Most preferably the amine monomer is selected from the group of DMAPAM, dimethylaminoethyl methacrylate, diethylallyl amine, dimethylaminopropyl methacrylate, dimethylamino propyl methacrylamide, diethylaminoethyl methacrylate, diethylaminopropyl acrylate. It is possible to use a single type of amine, but combinations of two or more amines may also be used.

The LCST monomer present in the polymer according to the invention is any monomer that in combination with the amine monomer forms a copolymer that has an LCST in the aqueous solution between 1° C. and 99° C.

The LCST monomer may be a monomer that polymerized as a homopolymer exhibits an LCST in the aqueous solution. Such monomer could be selected from the group of acrylamides, acrylates, vinylamides, alkyloxazolines, vinylimidazoles, and vinylethers. The use of acrylamides may be preferred. The LCST monomer generally has 2-20 carbon atoms, preferably 5-12 carbon atoms.

The LCST monomer may also be a monomer that when polymerized as a homopolymer has no LCST in the aqueous solution, but when copolymerized with the amine monomer exhibits a LCST in the aqueous solution. In this case the LCST monomer provides the proper hydrophilic/hydrophobic balance to ensure that the copolymer obtains the proper thermoresponsive behavior. It is noted that LCST-behaviour of polymers is known in the art, and that it is well within the scope of the skilled person to select a suitable LCST-monomer.

Preferably the LCST monomer is selected from the group of n-isopropylacrylamide, n-vinylcaprolactam, n-isopropyloxazoline, ethyloxazoline, n-propyloxazoline, n-vinylimidazole, n-acryloyl-pyrrolidin, diethylacrylamide, n-propylacrylamide, n-penta-methyleneacrylamide, methylethylacrylamide, n-ethylacrylamide, n-propyl methacrylamide, n-isopropylmethacrylamide, acryloyl morpholine, cyclopropylmethacrylamide, hydroxypropylcellulose, propylene glycol, ethylene glycol, diethyleneglycolacrylate, poly(ethyleneglycol)acrylate, n-tetrahydrofurfuryl acrylamide, n-tetrahydrofurfuryl methacrylamide, and poly(ethyleneglycol) methacrylate. It is possible to use a single type of LCST monomer, but combinations of two or more LCST monomers may also be used. The use of a single LCST monomer may sometimes be preferred to prevent unintentional interaction between the two types of monomers.

In one embodiment of the present invention, the LCST monomer has relatively low molecular weight, to reduce overall polymer mass. It may therefore be preferred for the molecular weight of the monomer to be below 200 g/mole, in particular in the range of 100-150 g/mole.

In addition to amine monomers and LCST monomers, the polymer used in the process according to the invention may comprise further monomers. Because these further monomers do not bind $CO_2$, it is preferred for the amount of other monomers to be relatively low, e.g., below 20 mol. %, calculated on the copolymer, preferably below 10 mole %, more preferably below 5 mole. %. It is preferred for the polymer used in the present invention to consist essentially of amine monomers and LCST monomers.

The polymer used in the process according to the invention forms a solution in the aqueous medium at temperatures below the LCST. To allow the formation of a solution, the polymer generally is substantially free from crosslinking monomers. In the present specification this means that, if present at all, e.g., as contaminants in one or more monomers, crosslinking monomers are present in an amount of less than 1 mol. % on the total amount of monomer in the system, preferably less than 0.5 mol. %. Crosslinking monomers are defined a monomers with two polymerisable groups, which are both polymerised in a copolymer chain, preferably a different chain.

In one embodiment the backbones of the LCST monomer and the amine are matched, to improve the polymerization properties, in particular the formation of narrow arrays, as described above. Examples in this context are the selection of an acrylamide amine in combination with an acrylamide LCST-monomer, the combination of an methacrylamide amine with an methacrylamide LCST monomer, the combination of methacrylate amine with an methacrylate LCST monomer, and the combination of acrylate amine with an acrylate LCST monomer.

In the following table, some examples of suitable copolymers are summarized:

| Amine | LCST-monomer | mole % of amine |
|---|---|---|
| Dimethylamino propyl acryl amide | n-isopropyl acryl amide | 10-50 mol %, preferably 20-40 mol % |
| Diethylamino ethyl methacryl amide | n-isopropyl acryl amide | 1-50 mol %, preferably 20-40 mol % |
| Dimethylamino propyl methacrylate | n-penta-methylene-acrylamide | 1-50 mol %, preferably 20-40 mol % |
| Diethylamino ethyl acrylate | n-penta-methylene-acryl-amide | 1-50 mol %, preferably 20-40 mol % |
| Diethylamino ethyl acrylate | diethyleneglycol-acrylate | 1-50 mol %, preferably 20-40 mol % |
| Diethylamino ethyl acrylate | diethyleneglycol-methacrylate | 1-50 mol %, preferably 20-40 mol % |
| Dimethylamino propyl methacrylate | n-propyl methacryl-amide | 1-50 mol %, preferably 20-40 mol % |
| Diethylamino propyl methacryl amide | n-propyl methacryl-amide | 1-50 mol %, preferably 20-40 mol % |
| Dimethylamino propyl methacrylate | diethyleneglycol-methacrylate | 1-50 mol %, preferably 20-40 mol % |
| Dimethylamino ethyl acrylate | n-isopropyl methacryl amide | 1-50 mol %, preferably 20-40 mol % |
| Dimethylamino ethyl acrylamide | n-isopropyl methacryl amide | 1-50 mol %, preferably 20-40 mol % |
| Dimethylaminopropyl acrylate | n-isopropyl acryl amide | 1-50 mol %, preferably 20-40 mol % |
| Diethylaminopropyl acrylate | n-propyl methacryl-amide | 1-50 mol %, preferably 20-40 mol % |
| Dimethylaminoethyl acrylate | diethyleneglycol-methacrylate | 1-50 mol %, preferably 20-40 mol % |
| 2-Diisopropylaminoethyl methacrylate | diethyleneglycol-methacrylate | 1-50 mol %, preferably 20-40 mol % |
| 2-Diisopropylaminoethyl acrylate | poly(ethyleneglycol) acrylate | 1-50 mol %, preferably 20-40 mol % |
| Dimethylaminopropylacryl amide + 2-Aminoethyl methacrylate | n-isopropyl acryl amide | 1-50 mol %, preferably 20-40 mol % |
| N-(3-Aminopropyl) methacryl-amide + 2-Aminoethyl methacrylate | n-isopropyl acryl amide | 1-50 mol %, preferably 20-40 mol % |
| t-Butylaminoethyl methacrylate | diethyleneglycol-methacrylate | 1-50 mol %, preferably 20-40 mol % |
| t-Butylaminoethyl methacrylate + Dimethylaminopropylacryl amide | n-isopropyl acryl amide | 1-50 mol %, preferably 20-40 mol % |

Of these, the following are considered preferred: the combination of Dimethylamino propyl acryl amide and n-isopropyl methacryl amide, the combination of n-isopropyl methacryl amide and Dimethylamino ethyl acrylamide, the combination of Dimethylaminoethyl acrylate and diethyleneglycolmethacrylate, and the combination of n-pentamethyleneacrylamide and Dimethylamino propyl methacrylate.

The thermoresponsive copolymer used in the present invention generally has a weight average molecular weight Mw of at least 500 g/mole. If the molecular weight of the polymer is below this value LCST behaviour is difficult to obtain. Preferably, the copolymer has a molecular weight Mw of at least 10 000 g/mole. A maximum for the molecular weight is not critical, as a general value, maximum of at most 2 000 000 may be mentioned.

The $CO_2$ absorbing agent used in the process according to the invention comprises the polymer described above in an aqueous medium. The $CO_2$ absorbing agent generally comprises 0.1-70 wt % of thermoresponsive copolymer, preferably 1-50 wt %, more preferably 10-40 wt %.

The water content of the $CO_2$ absorbing agent generally is in the range of 1-99 wt %, preferably in the range of 50-95 wt %, most preferably in the range of 60-80 wt %.

The $CO_2$ absorbing agent used in the process according to the invention additionally comprises an amine component, and may additionally comprise further components. The amine component in the $CO_2$ absorbing agent is dissolved in the aqueous medium. The presence of amine components increases the amine concentration in the system in this way increasing the $CO_2$ absorption capacity per volume. The amine component is preferably present in an amount up to 20 wt. %, preferably in an amount of 10 to 20 wt. %. Examples of suitable amines in this context are compounds containing at least one primary, secondary or tertiary amine functional group. In one embodiment, the amine comprises compounds containing at least one primary amine functional group. In a further embodiment, the amine comprises compounds containing at least one secondary amine functional group. In a further embodiment the amine comprises compounds containing at least one tertiary amine functional group. The amine preferably has in the range of 2 to 20 carbon atoms, more preferably in the range of 5 to 12 carbon atoms.

Suitable amines in this context include Heptylamine, 2-aminoheptane, (2-methylcyclohexyl)amine, 1-Octanamin, 1-amino-2-ethylhexane, 1,5-Dimethylhexylamine, 3,3,5-trimethylcyclohexylamine, N-Decylamine, Dipropylamine (DPA), Ethylbutylamine (EBA), Diallylamine (DAA), N-Ethyl-2-methylallylamine (EMAA), N-Methylcyclohexylamine (MCA), Dibutylamine, Di-sec-butylamine (DsBA), Di-iso-butylamine (DiBA), N-ethyl-cyclohexylamine, N-Isopropylcyclohexylamine, Dipentylamine, N,N-Dimethyloctylamine, Dihexylamine, N,N-Diisopropylethylamine (DPEA), N,N-Dimethylcyclohexylamine (DMCA), Triallylamine, Tripropylamine, N,N-diethyl-cyclohexamine, N,N,N,N,-tetramethyl-1,6-hexanediamine, N-methyl-diethanolamine (MDEA), Piperazine, diglycolamine, diethanolamine, diisopropylamine, Tributylamine Triisobutylamine and 2-aminoethanol (MEA). Most preferred are 2-aminoethanol, n-methylcyclohexylamine, n-methyldiethanolamine, hexylamine, n,n-dimethylcyclohexylamine. In another embodiment the $CO_2$ absorbing agent additionally comprises amine monomers dissolved in the aqueous medium, wherein the amine monomers are the monomers specified above for incorporation into the polymers. Most preferred are Dimethylaminopropyl acrylamide, diethylaminoethyl methacrylamide, dimethylaminopropyl methacrylate and diethylaminoethyl acrylate.

In the process according to the invention, the first step is contacting a $CO_2$-containing gas stream with the $CO_2$-absorbing agent described above in a vessel with a maximum temperature T1, which is below the LCST of the thermoresponsive polymer at maximum $CO_2$ loading.

The nature of the $CO_2$-containing gas stream is not critical to the process according to the invention. The gas stream may be derived, e.g., from a power plant or other chemical reactor. The $CO_2$ content of the gas stream may vary between wide ranges. In one embodiment, the $CO_2$-content is in the range of 1 to 20 vol. %, calculated on the total volume of the gas stream, in particular 4 to 12 vol. %. The gas steam may contain further components such as nitrogen and oxygen.

It is preferred for the $CO_2$-containing gas stream to be substantially free of NOx and SOx compounds, because they irreversibly bind to the amine in the polymer. These compounds, if present al all, are preferably present in an amount of less than 100 ppm, more preferably less than 10 ppm, most preferably less than 1 ppm.

The gas stream is contacted with the $CO_2$ absorbing agent in a vessel in a manner which ensures intimate contact between the $CO_2$ in the gas and the liquid $CO_2$ absorbing agent. This can be done in manners known in the art, e.g., using an absorption column. The gas stream may be contacted with the $CO_2$ absorbing agent in cocurrent or countercurrent operation, with countercurrent operation being preferred.

As indicated above, T1 is below the LCST of the polymer at maximum $CO_2$ loading in the reaction medium. In general, T1 lies in the range of 0-90° C., more preferably in the range of 5-60° C., still more preferably in the range of 20-50° C. In one embodiment it may be preferred for T1 to be at least 5° C. below the LCST, preferably below 10° C.

The temperature of the gas as it is contacted with the $CO_2$ absorbing agent is not critical, as long as the temperature of the $CO_2$ absorbing agent stays in the range stipulated for T1.

The pressure in the process according to the invention is not critical. In one embodiment the process according to the invention is carried out at a pressure of 1-10 bar, e.g., in the range of 1-5 bar, more specifically in the range of 1-1.1 bar.

This step yields a $CO_2$ containing $CO_2$ absorbing agent, and a $CO_2$-lean gas stream.

In one embodiment, the $CO_2$-lean gas stream has a $CO_2$ content which is at most 20% of the $CO_2$ content of the starting $CO_2$-containing gas stream, in particular at most 10%.

In the next step of the process according to the invention the temperature of the $CO_2$-absorbing agent is increased. Preferably the $CO_2$ absorbing agent is brought into a second vessel, which is preferably a distillation column, but could be any vessel. The maximum temperature of this vessel is T2. T2 is above the LCST of the polymer at minimum $CO_2$ loading, and increasing the temperature to T2 will result in the release of $CO_2$. In general, T2 lies in the range of 40-100° C., preferably in the range of 40-90° C., more preferably in the range of 40-80° C. It may be preferred for T2 to be at least 10° C. above the LCST, more preferably at least 30° C.

The second column is operated at a pressure of 1-10 bar, preferably at a pressure of 1-3 bar. $CO_2$ desorption can be enhanced by using ultrasound, nucleation by solid particles or stirring.

This step leads to the formation of a $CO_2$-containing gas stream, and a $CO_2$-absorbing agent from which $CO_2$ has been desorbed. The $CO_2$-containing gas stream generally consist for at least 80 vol. % of $CO_2$, more preferably for at least 95 vol. %, still more preferably for at least 99 vol. %. Additionally the $CO_2$-containing gas stream resulting from the desorption step generally comprises water resulting from the $CO_2$-absorbing agent. Water may, e.g., be present in an amount of 0 to 10 vol. %, preferably 0 to 1 vol. %. The $CO_2$ released may be processed as desired. It can. e.g., be subsequently compressed to 20-100 bar. Water in the recovered $CO_2$-containing gas stream can be removed by condensation, resulting in the very high $CO_2$ concentrations mentioned above. The $CO_2$-absorbing agent as it results from the desorption step is generally recycled to the $CO_2$ absorption step.

In one embodiment it may be preferred for the range for $\alpha_{T1}$ to be 0.4-1.0. Preferably the range for $\alpha_{T1}$ is 0.7-0.9 for $CO_2$ absorbing agents containing solely tertiary amine monomers. For $CO_2$ absorbing agents containing solely primary and secondary amine monomers it may be preferred for the range for $\alpha_{T1}$ to be 0.2-0.5, preferably the range for $\alpha_{T1}$ is 0.35-0.5. For $CO_2$ absorbing agents containing a combination of tertiary and primary or secondary amine monomers the range of $\alpha_{T1}$ is preferred to be the weighed average of the $\alpha_{T1}$ of the tertiary amine part and the $\alpha_{T1}$ of the primary/secondary amine part.

In one embodiment it may be preferred for the range for $\alpha_{T2}$ to be 0-0.4. Preferably the range for $\alpha_{T1}$ is 0-0.3, most preferably the range is 0.0-0.2 for $CO_2$ absorbing agents containing solely tertiary amine monomers. For $CO_2$ absorbing agents containing solely primary and secondary amine monomers it may be preferred for the range for $\alpha_{T2}$ to be 0-0.2, preferably the range for $\alpha_{T2}$ is 0-0.15. For $CO_2$ absorbing agents containing a combination of tertiary and primary or secondary amine monomers the range of $\alpha_{T2}$ is preferred to be the weighed average of the $\alpha_{T2}$ of the tertiary amine part and the $\alpha_{T2}$ of the primary/secondary amine part.

An important feature of the process according to the invention is that a high net $CO_2$ sorption may be obtained. For example, the net CO2 sorption in the process according to the invention may be at least 0.3, in particular at least 0.4, in some embodiments at least 0.5. In one embodiment, the net $CO_2$ sorption in the process according to the invention over the temperature range of 25 to 75° C. is at least 0.3, more in particular at least 0.5. In another embodiment, the net $CO_2$ sorption in the process according to the invention over the temperature range of 50 to 75° C. is at least 0.2, more in particular at least 0.3. In a further embodiment, the net $CO_2$ sorption in the process according to the invention over the temperature range of 40 to 80° C. is at least 0.25, more in particular at least 0.4.

In one embodiment of the process according to the invention, the difference between T2 and T1 (=T2−T1) lies in the range 10-100° C., more preferably the difference lies in the range of 5-70° C., still preferably the difference lies in the range of 20-50° C.

The process according to the invention can be carried out in batch operation, where the aforementioned steps are occurring at different times. However, preferably the process is carried out in continuous mode where the aforementioned steps are occurring at different locations simultaneously.

In one embodiment, the process according to the invention is carried out in a swing mode, wherein the $CO_2$ absorbing agent is present in a reaction vessel, wherein in a first step a $CO_2$-containing gas stream is provided to the vessel, and the vessels is kept at a temperature resulting in absorption of $CO_2$. Then, the flow of $CO_2$-containing gas stream is stopped, and the temperature of the vessel is increased to a value where $CO_2$ is desorbed, and the resulting $CO_2$ is withdrawn from the vessel.

In another embodiment, the process according to the invention is carried out using separate vessels for the absorption step and the desorption step. In this embodiment, the process comprises the steps of contacting a $CO_2$-containing gas stream with a $CO_2$-absorbing agent in an absorption column with a maximum temperature T1 resulting in absorption of $CO_2$, and leading the $CO_2$ containing absorbing agent to a second column with a maximum temperature T2 resulting in the release of $CO_2$. This process is a preferred embodiment of the process according to the invention. One embodiment of this process is illustrated in FIG. 1.

Figure 1:
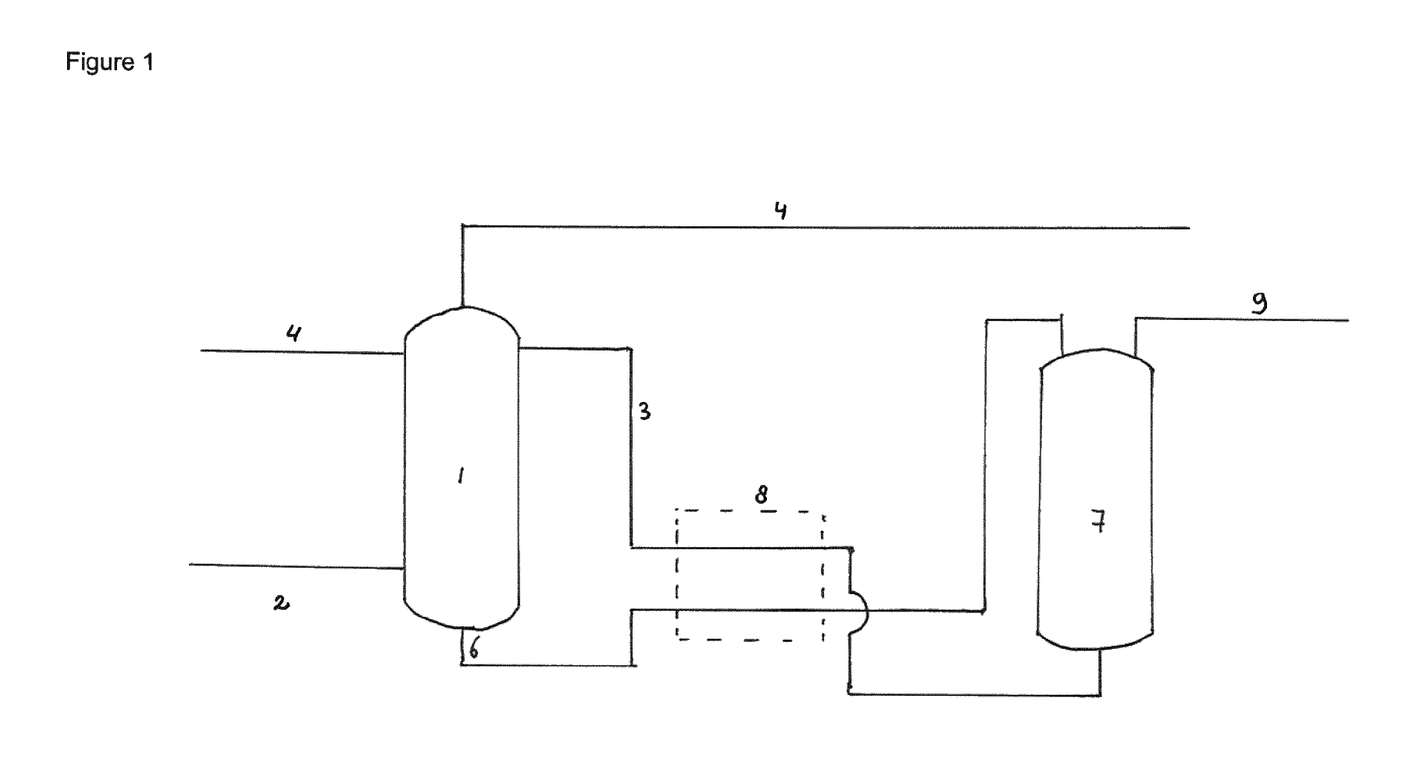
In FIG. 1, a $CO_2$-containing gas stream (2) is provided to the bottom of an absorption column (1), with a maximum temperature T1.

In FIG. 1, a $CO_2$-containing gas stream (2) is provided to the bottom of an absorption column (1), with a maximum temperature T1. The $CO_2$ absorbing agent is provided to the top of the column through line (3), ensuring countercurrent operation. The maximum temperature T1 is the highest temperature in the absorption column. $CO_2$ is absorbed from the $CO_2$-containing gas stream. If so desired make-up liquid may be added to the process through line (4). Make-up liquid may comprise water to make up for evaporation losses, and polymer to make up for losses in the process. A gas stream from which $CO_2$ has been removed is withdrawn from the column through line (5).

The $CO_2$ absorbing agent which has absorbed $CO_2$ is withdrawn from the bottom of the column through line (6), and provided to the top of a desorption column (7), after having passed through a heat exchanger (8), where the temperature is increased. Desorption column (7) has a maximum temperature T2 which is above the LCST of the $CO_2$ absorbing agent, resulting in release of the $CO_2$ from the $CO_2$ absorbing agent. A $CO_2$-containing gas stream is withdrawn from the desorption reactor through line (9). The $CO_2$-containing gas stream generally also contains water.

Therefore, in one embodiment, the $CO_2$-containing gas stream may be provided to a step (not shown) wherein to $CO_2$ and water are separated. The $CO_2$ absorbing agent is removed from desorption column (7) through a line (3) at the bottom of the unit, which line (3) passes through heat exchanger (8), and recycles the $CO_2$ absorbing agent to absorption reactor (1).

The invention is illustrated by the following examples, without being limited thereto or thereby.

EXAMPLES

Experimental Setup

Figure 2:
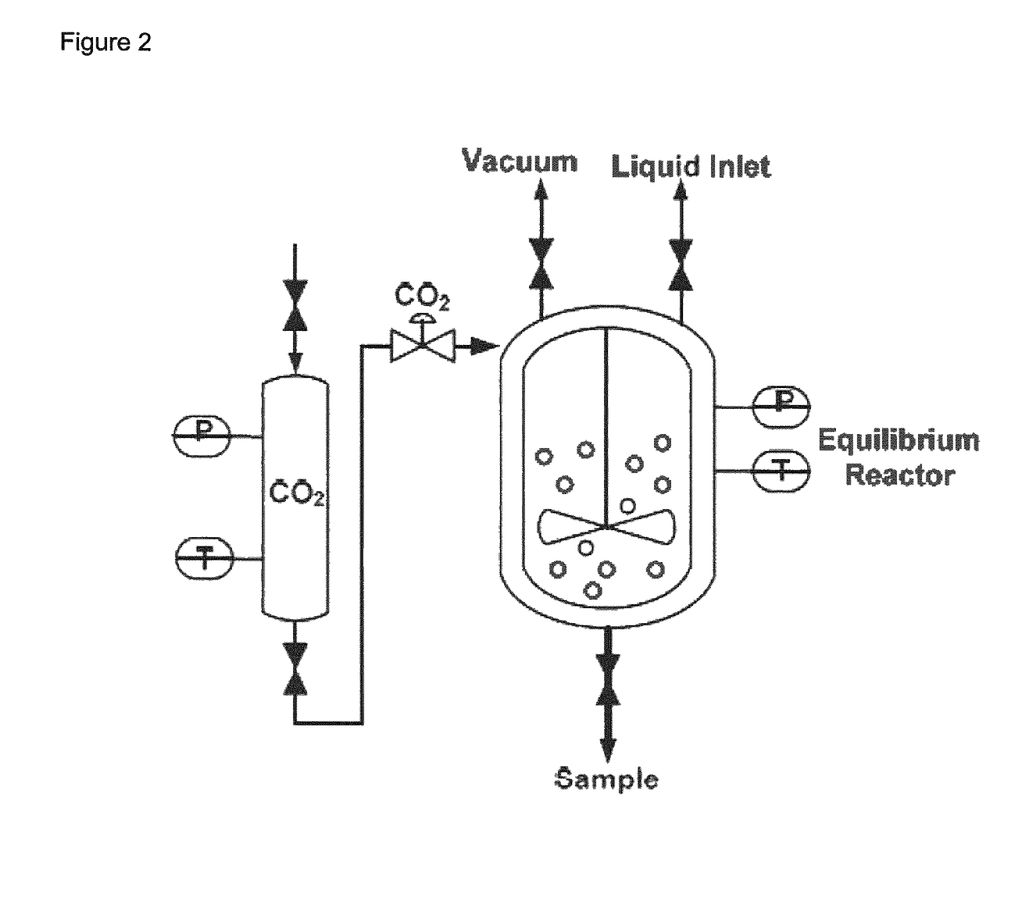
FIG. 2 shows a schematic representation of the Equilibrium Set-up (ES).

For the experiments an Equilibrium Set-up (ES) was at atmospheric conditions. This set-up contains a gas storage vessel (500 ml; T and P are monitored), which is connected to the reactor (267 ml; T and P monitored). The reactor contains a gas-inducing impeller (up to 10,000 rpm). Liquid enters the reactor at the liquid inlet, which can be closed hermetical afterwards. The vacuum pump is connected to both the reactor and the gas storage vessel independently. FIG. 2 shows a schematic representation of the ES. The pressure indicators (0-10 bar for the storage vessel) and 0-2 bar for the reactor have a typical inaccuracy of 0.1% FS).

Procedure

The vessel was filled with 100 ml of $CO_2$ absorbing agent with a known amount of amines and degassed several times. Next the vessel was brought to the desired temperature. A gas mixture of $CO_2$ and nitrogen of 1 bar total pressure ($P_{CO2}$=100 mbar) was led into the reactor. The temperature and pressure inside both the reactor and the gas storage vessel were monitored. From the monitored $CO_2$ flow into the reactor the alpha values were calculated.

Six systems were tested. The polymers or monomers used are given in Table 1; the composition of the $CO_2$ absorbing agents is given in Table 2. Of these, only system 1 is according to the invention. The other systems are comparative. Of these, systems 2, 3, 4, and 5 do not contain a copolymer. System 6 contains a copolymer, but dimethylacrylamide (DMAA) does not have an LCST.

TABLE 1

Experimental systems $CO_2$ absorbing agents

1  Copolymer (20 mol % DMAPAM and 80 mol % NIPAM) in water
2  DMAPAM monomers + NIPAM homopolymer in water
3  DMAPAM monomers in water
4  MEA in water
5  DMAPAM homopolymer
6  Copolymer (20 mol % DMAPAM and 80 mol % dimethylacrylamide(DMAA)) in water

TABLE 2

Compositions of CO2 absorbing agents

| | NIPAM polymer [g] | DMAPAM polymer [g] | Copolymer DMAPAM/ NIPAM [g] | Copolymer DMAPAM/ DMAA [g] | DMAPAM [g] | MEA [g] | Water [g] |
|---|---|---|---|---|---|---|---|
| 1 | — | — | 15.22 | — | — | — | 86.8 |
| 2 | 11.32 | — | — | — | 3.91 | — | 86.8 |
| 3 | — | — | — | — | 3.91 | — | 96.6 |
| 4 | — | — | — | — | — | 1.53 | 98.5 |
| 5 | — | 3.91 | — | — | — | — | 96.6 |
| 6 | — | — | — | 14.47 | — | — | 87.4 |

Amounts are Based on a Total Volume of 100 mL.

Results

Figure 3:
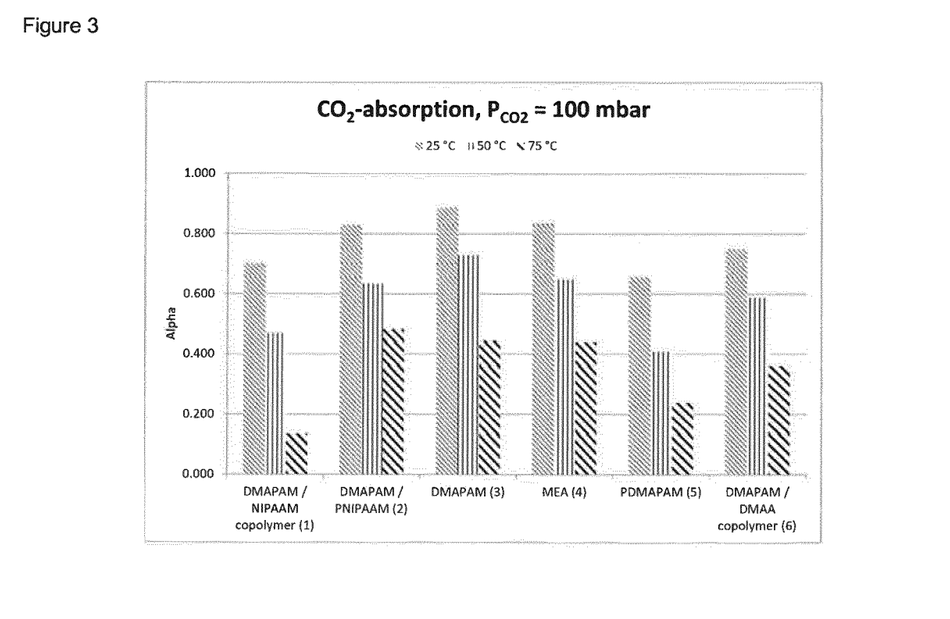
In FIG. 3 the α values are plotted for experimental systems (1 to 6) for three temperatures.
Figure 4:
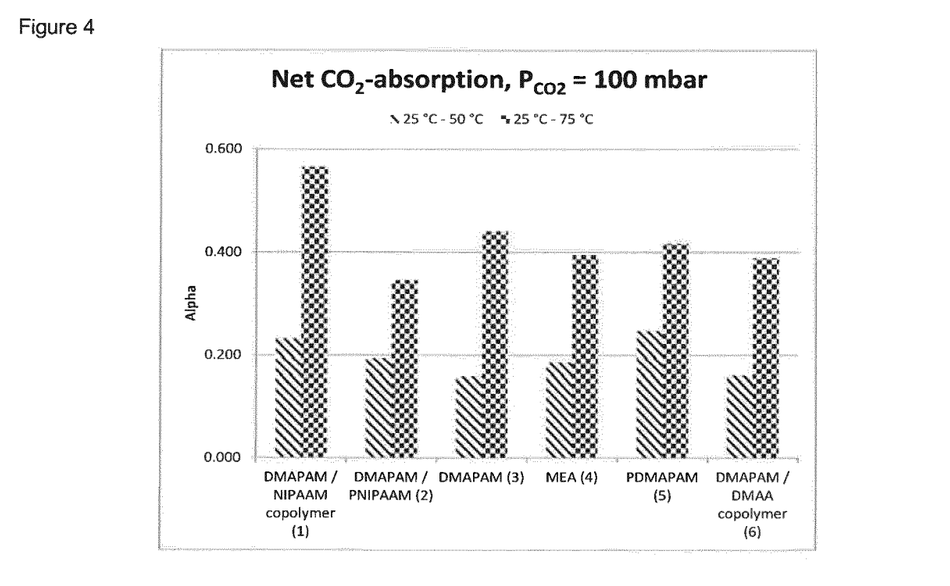
In FIG. 4 the differences in a values between two temperatures have been plotted.

In FIG. 3 the α values are plotted for experimental systems (1 to 6) for the three temperatures. In FIG. 4 the differences in α values between two temperatures have been plotted. From FIG. 4 it can be concluded that the $CO_2$ absorbing agent containing the copolymer DMAPAM/NIPAM shows highest net $CO_2$ absorption.

The invention claimed is:

1. A method for capturing $CO_2$ from a $CO_2$-containing gas stream, comprising:
    (a) contacting a $CO_2$-containing gas stream with a $CO_2$-absorbing agent in an absorption step in a vessel with a maximum temperature T1, resulting in absorption of $CO_2$, wherein the $CO_2$-absorbing agent comprises a polymer and an amine component dissolved in an aqueous medium, wherein the polymer is a thermoresponsive copolymer comprising an amine monomer distributed through the copolymer based on one of the following monomer combinations: the combination of dimethylamino propyl acryl amide and n-isopropyl methacryl amide, the combination of n-isopropyl methacryl amide and dimethylamino ethyl acrylamide, the combination of dimethylaminoethyl acrylate and diethyleneglycolmethacrylate, or the combination of n-penta-methyleneacrylamide and dimethylamino propyl methacrylate, and wherein the amine component is present in an amount of up to 20 wt.%, and
    (b) subjecting the $CO_2$-containing absorbing agent to a desorption step in a vessel with a maximum temperature T2, resulting in the release of $CO_2$, wherein T1 is below the LCST of the thermoresponsive polymer at maximum $CO_2$ loading, and T2 is above the LCST of the thermoresponsive polymer at minimum $CO_2$ loading.

2. The method according to claim 1, wherein the amine component dissolved in the aqueous medium is present in an amount of 10 to 20 wt. %.

3. The method according to claim 1, wherein the thermoresponsive polymer has an LCST in the range of 1-99° C.

4. The method according to claim 1, wherein the amine monomers are distributed such that at least 80% of the amine monomers in the polymer are present in arrays of maximum 10 amine monomers, which are combined with arrays of thermoresponsive monomers, with each polymer molecule comprising at least 2 areas of both monomer types.

5. The method according to claim 1, wherein at least 50% of the amine monomers is present in the copolymer in arrays with a size of 1-8 monomers.

6. The method according to claim 1, wherein the thermoresponsive monomer is distributed such that at least 50% of the thermoresponsive monomers in the polymer are present in arrays of 3-30 monomers.

7. The method according to claim 1, wherein the amine monomer content in the thermoresponsive copolymer is in the range of 0.1-99 mol %.

8. The method according to claim 1, wherein net $CO_2$ sorption is at least 0.3.

9. The method according to claim 1, wherein the polymer is substantially free from crosslinking monomers.

10. The method according to claim 1, wherein the $CO_2$-absorbing agent comprises 0.1-70 wt % of thermoresponsive copolymer.

11. The method according to claim 1, wherein the amine monomer is selected from the group consisting of dimethylaminopropyl acrylamide, diethylaminoethyl methacrylamide, dimethylaminopropyl methacrylate and diethylaminoethyl acrylate.

12. The method according to claim 1, wherein the $CO_2$-content of the $CO_2$-containing gas stream is in the range of 1 to 20 vol. %, calculated on the total volume of the gas stream.

13. The method according to claim 1, wherein T1 is between 0-90° C.

14. The method according to claim 1, wherein T2 is between 40-100° C.

15. A method for capturing $CO_2$ from a $CO_2$-containing gas stream, comprising:
    (a) contacting a $CO_2$-containing gas stream with a $CO_2$-absorbing agent in an absorption step in a vessel with a maximum temperature T1, resulting in absorption of $CO_2$, wherein the $CO_2$-absorbing agent comprises a polymer and an amine component dissolved in an aqueous medium, wherein the polymer is a thermoresponsive copolymer comprising an amine monomer distributed through the copolymer, wherein the amine monomer is selected from the group consisting of dimethylaminopropyl acrylamide, diethylaminoethyl methacrylamide, dimethylaminopropyl methacrylate and diethylaminoethyl acrylate, and wherein the amine component is present in an amount of up to 20 wt. %, and
    (b) subjecting the $CO_2$-containing absorbing agent to a desorption step in a vessel with a maximum temperature T2, resulting in the release of $CO_2$, wherein T1 is below the LCST of the thermoresponsive polymer at maximum $CO_2$ loading, and T2 is above the LCST of the thermoresponsive polymer at minimum $CO_2$ loading.

16. The method according to claim 1, wherein the amine component dissolved in the aqueous medium is present in an amount of 10 to 20wt. %.

17. The method according to claim 1, wherein the thermoresponsive polymer has an LCST in the range of 1-99° C.

18. The method according to claim 1, wherein the amine monomers are distributed such that at least 80% of the amine monomers in the polymer are present in arrays of maximum 10 amine monomers, which are combined with arrays of thermoresponsive monomers, with each polymer molecule comprising at least 2 areas of both monomer types.

19. The method according to claim 1, wherein at least 50% of the amine monomers is present in the copolymer in arrays with a size of 1-8monomers.

20. The method according to claim 1, wherein the thermoresponsive monomer is distributed such that at least 50% of the thermoresponsive monomers in the polymer are present in arrays of 3-30 monomers.

21. The method according to claim 1, wherein the amine monomer content in the thermoresponsive copolymer is in the range of 0.1-99mol %.

22. The method according to claim 1, wherein the polymer is based on one of the following monomer combinations: the combination of dimethylamino propyl acryl amide and n-isopropyl methacryl amide, the combination of n-isopropyl methacryl amide and dimethylamino ethyl acrylamide, the combination of dimethylaminoethyl acrylate and diethyleneglycolmethacrylate, or the combination of n-penta-methyleneacrylamide and dimethylamino propyl methacrylate.

23. The method according to claim 1, wherein net $CO_2$ sorption is at least 0.3.

24. The method according to claim 1, wherein the polymer is substantially free from crosslinking monomers.

25. The method according to claim 1, wherein the $CO_2$-absorbing agent comprises 0.1-70 wt % of thermoresponsive copolymer.

26. The method according to claim 1, wherein the $CO_2$-content of the $CO_2$-containing gas stream is in the range of 1 to 20 vol. %, calculated on the total volume of the gas stream.

27. The method according to claim 1, wherein T1 is between 0-90° C.

28. The method according to claim 1, wherein T2 is between 40-100° C.

* * * * *